United States Patent
Saiga

(10) Patent No.: US 8,928,957 B2
(45) Date of Patent: Jan. 6, 2015

(54) LIGHT GUIDE, ILLUMINATION DEVICE AND IMAGE READING APPARATUS

(75) Inventor: Takeyoshi Saiga, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/616,239

(22) Filed: Sep. 14, 2012

(65) Prior Publication Data

US 2013/0070312 A1 Mar. 21, 2013

(30) Foreign Application Priority Data

Sep. 16, 2011 (JP) ................................. 2011-203284

(51) Int. Cl.
- *H04N 1/04* (2006.01)
- *H04N 1/028* (2006.01)
- *H04N 1/03* (2006.01)
- *H04N 1/10* (2006.01)
- *H04N 1/193* (2006.01)

(52) U.S. Cl.
CPC ....... *H04N 1/02855* (2013.01); *H04N 1/02865* (2013.01); *H04N 1/02885* (2013.01); *H04N 1/0289* (2013.01); *H04N 1/0303* (2013.01); *H04N 1/0305* (2013.01); *H04N 1/1017* (2013.01); *H04N 1/193* (2013.01); *H04N 2201/0081* (2013.01)
USPC ........... 358/484; 358/475; 358/474; 358/482; 358/483

(58) Field of Classification Search
USPC ......... 358/475, 484, 483, 482, 509, 515, 514; 250/227.11, 208.1, 239, 234–236, 216; 399/220, 221; 355/67–71
See application file for complete search history.

(56) References Cited

U.S. PATENT DOCUMENTS

| | | | | |
|---|---|---|---|---|
| 5,810,463 | A * | 9/1998 | Kawahara et al. | 362/601 |
| 6,464,366 | B1 * | 10/2002 | Lin et al. | 362/616 |
| 7,717,598 | B2 * | 5/2010 | Kakizaki et al. | 362/551 |
| 7,755,811 | B2 * | 7/2010 | Herloski et al. | 358/475 |
| 7,760,403 | B2 * | 7/2010 | Sakurai | 358/484 |
| 7,920,304 | B2 * | 4/2011 | Tatsuno et al. | 358/475 |
| 2008/0112166 | A1 | 5/2008 | Kakizaki et al. | |
| 2009/0080038 | A1 | 3/2009 | Hayashide et al. | |
| 2013/0222866 | A1 * | 8/2013 | Sugiyama | 358/497 |

FOREIGN PATENT DOCUMENTS

| | | |
|---|---|---|
| CN | 1831423 A | 9/2006 |
| CN | 101360170 A | 2/2009 |
| JP | 2008-123766 A | 5/2008 |
| JP | 2009-272215 A | 11/2009 |
| JP | 4-533235 B2 | 9/2010 |
| JP | 4533235 B2 | 9/2010 |

OTHER PUBLICATIONS

Notification of the First Office Action for corresponding CN 201210334945.8, mail date Dec. 25, 2013. English translation provided.

* cited by examiner

*Primary Examiner* — Cheukfan Lee
(74) *Attorney, Agent, or Firm* — Rossi, Kimms & McDowell LLP

(57) ABSTRACT

A light guide has first and second light guide parts (S, T) in front and rear of a constricted part (2). The first light guide has first and second side parts (1a, 1b). The second light guide part has a reflection condensing part (4) and third and fourth side parts extending from the constricted part to divert the first and second side parts more outward than imaginary surfaces (1c, 1d) as extensions of the first and second side parts beyond the constricted part.

15 Claims, 7 Drawing Sheets

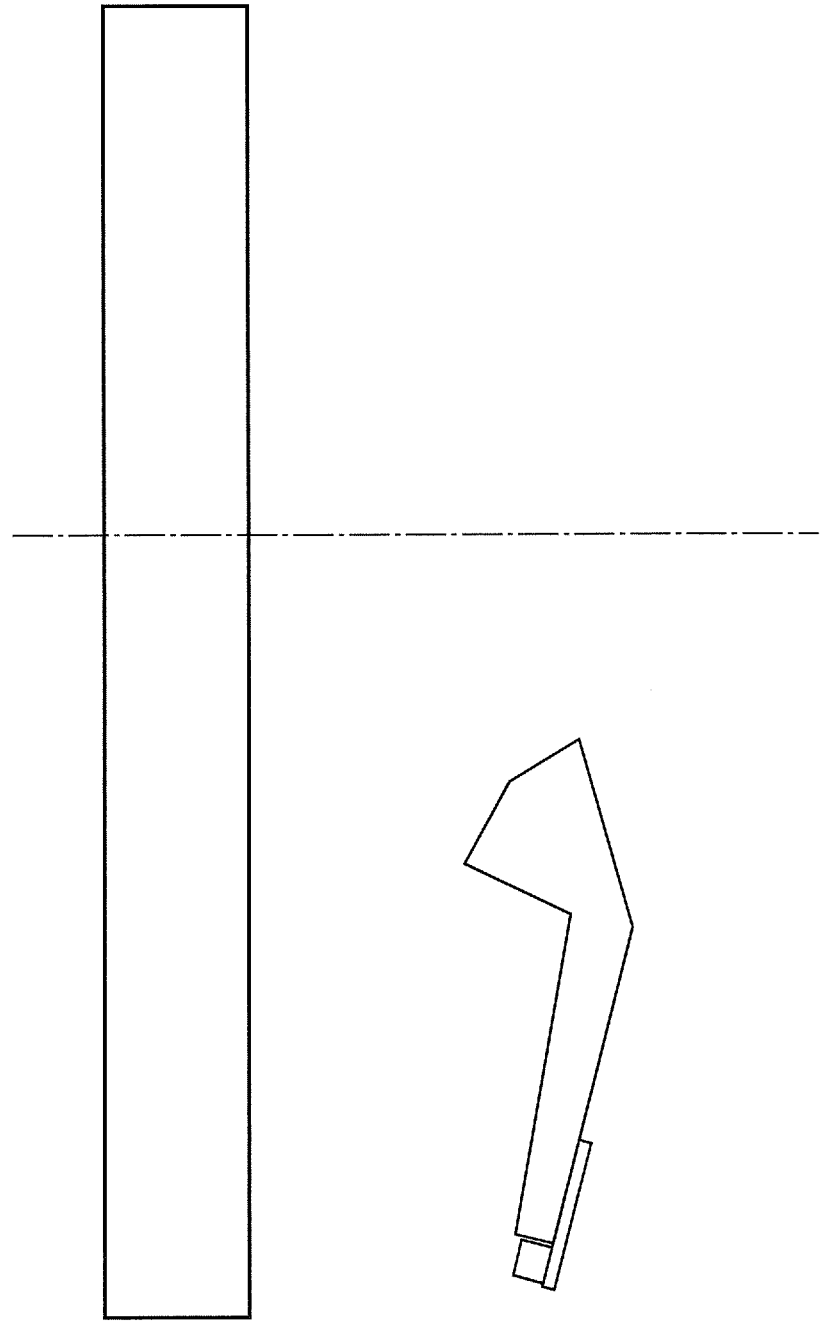

LIGHT GUIDE, ILLUMINATION DEVICE AND IMAGE READING APPARATUS

BACKGROUND OF THE INVENTION

1. Field of the Invention

The present invention relates to a light guide, an illumination device, and an image reading apparatus. The present invention is suitably applied particularly to an image reading apparatus such as an image scanner, a copying machine, facsimile machine or the like that reads an image while illuminating the surface of an original.

2. Description of the Related Art

A need for reduction in cost and increase in the operation speed of image reading apparatuses has been growing. In response to this, the sensor size has been made smaller, necessitating decreases in the reduction ratio of reduction optical systems. Consequently, more bright original illumination systems are demanded in order to achieve image qualities as high as before. To this end, light emitting diodes (LED) having high light emitting efficiency may be used.

When point light sources like LEDs are used in the light source, a plurality of point light sources are arranged along the main scanning direction in many cases. If light beams emitted from the plurality of point light sources are directly delivered to the surface of an original, illumination unevenness with respect to the direction along which the light sources are arranged will occur, leading to density unevenness in the read image. The publication of Japanese Patent No. 4533235 and Japanese Patent Application Laid-Open No. 2008-123766 disclose methods of reducing illumination unevenness in the image reading apparatus using a plurality of point light sources. The publication of Japanese Patent No. 4533235 discloses an illumination apparatus that uses a light guide in order to reduce illumination unevenness with respect to the direction of arrangement of light sources. In this apparatus, direct light beams and light beams reflected in the light guide are aligned. Japanese Patent Application Laid-Open No. 2008-123766 discloses an illumination apparatus provided with a light guide with a light exit surface having a condensing function.

However, there is a need for image reading apparatuses having a further increased reading speed. The illumination apparatuses disclosed in the publication of Japanese Patent No. 4533235 and Japanese Patent Application Laid-Open No. 2008-123766 do not meet this need because of insufficient condensing efficiency with respect to the sub-scanning direction (i.e. the direction perpendicular to the main scanning direction or the direction of arrangement of the light sources). Specifically, in the apparatus disclosed in the publication of Japanese Patent No. 4533235, while it is possible to align the direct light and the light having been reflected multiple times in the light guide, condensing of the direct light and the multi-reflected light is insufficient in particular with respect to the sub-scanning direction.

In the apparatus disclosed in Japanese Patent Application Laid-Open No. 2008-123766, direct light and multi-reflected light having passed through the light guide are condensed only by the light exit part. Therefore, it is not easy to achieve both condensing of each light beam and condensing of direct light and multi-reflected light. For this reason, the condensing efficiency with respect to the sub-scanning direction is insufficient.

SUMMARY OF THE INVENTION

A light guide according to the present invention comprises a first light guide part that guides light beams coming from a light source from an incident part to a constricted part, in a cross section perpendicular to a direction of arrangement of the light source, which is arranged one dimensionally, and a second light guide part that is integrated with the first light guide part and bends the optical path of light beams coming from the incident part and passing through the constricted part in the cross section perpendicular to the direction of arrangement of the light source to guide the light beams to a light exit part having a condensing function through which the light beams exit, wherein the first light guide part has a first side part that totally reflects light beams traveling from the incident part in a first direction and a second side part that totally reflects light beams traveling from the incident part in a second direction in the cross section perpendicular to the direction of arrangement of the light source to deliver light beams traveling from the incident part and totally reflected by at least one of the first side part and the second side part and light beams traveling from the incident part directly without being reflected by the first side part or the second side part to the constricted part in a superposed state, and the second light guide part has a reflection condensing part that has a condensing function in the cross section perpendicular to the direction of arrangement of the light source, is located at a predetermined distance from the constricted part, and totally reflects light beams further diverging after passing through the constricted part, a third side part that runs from the constricted part more outward than an imaginary surface as an extension of the first side part beyond the constricted part to connect the first side part to the light exit part in such a way that light beams traveling from the constricted part toward the reflection condensing part are not restricted, and a fourth side part that runs from the constricted part more outward than an imaginary surface as an extension of the second side part beyond the constricted part to connect the second side part to the reflection condensing part in such a way that light beams traveling from the constricted part toward the reflection condensing part are not restricted and that the reflection condensing part is enlarged.

Further features of the present invention will become apparent from the following description of exemplary embodiments with reference to the attached drawings.

BRIEF DESCRIPTION OF THE DRAWINGS

FIG. 7 is a schematic diagram of a conventional light guide.

DESCRIPTION OF THE EMBODIMENTS

Preferred embodiments of the present invention will now be described in detail in accordance with the accompanying drawings.

First Embodiment

Figure 3:
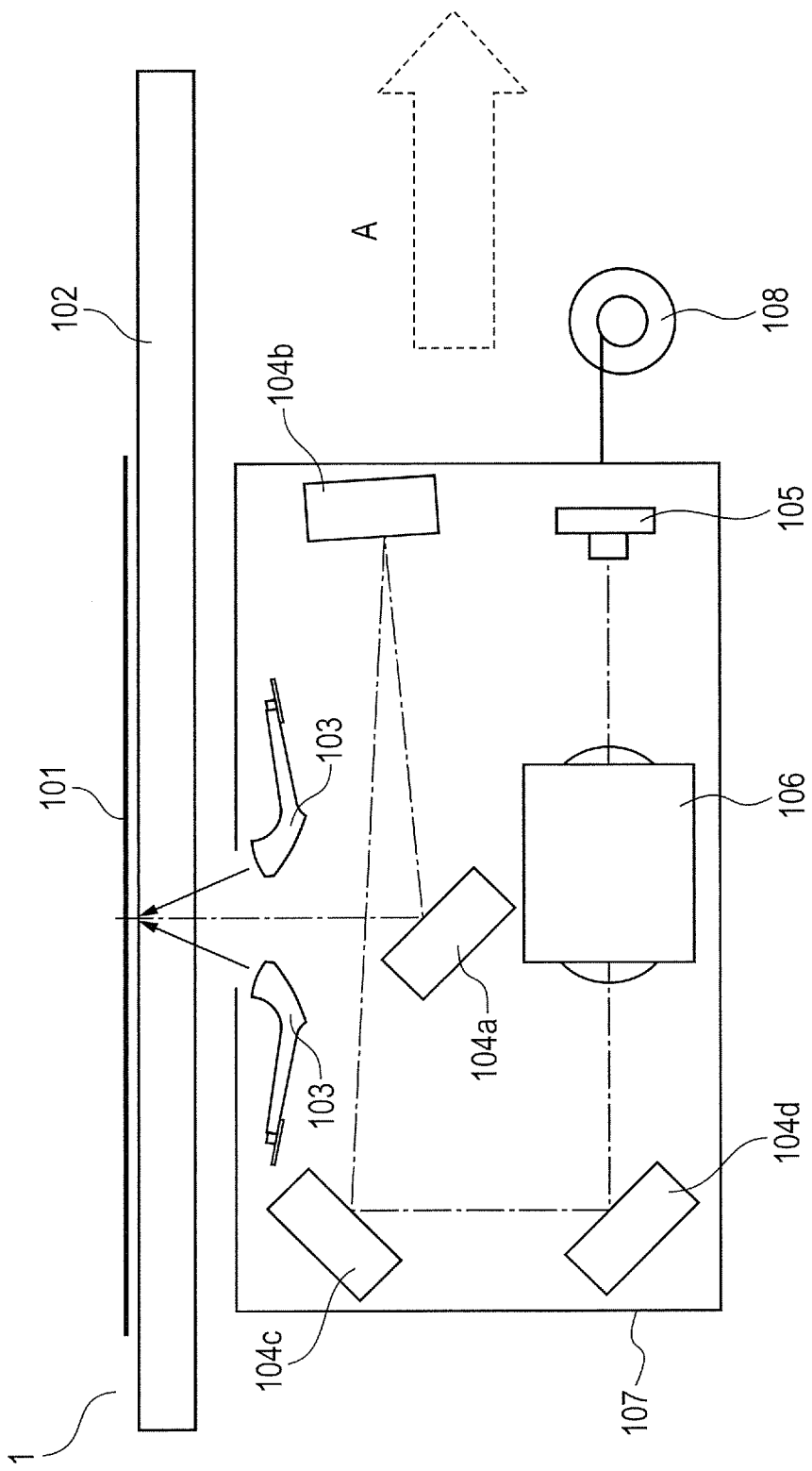
FIG. 3 is a schematic diagram showing the basic configuration of an image reading apparatus equipped with the light guides according to the embodiment of the present invention and the illumination device.

FIG. 3 is a diagram showing the basic construction of an image pickup apparatus equipped with a light guide and an illumination device according to an embodiment of the present invention. An integrated-type scanning optical system unit 107 (which will also be referred to as a "carriage" hereinafter) has an illumination device 103 that illuminates an original 101 placed on a glass original table (original table) 102 and a reading unit (e.g. a line sensor or image sensor) 105 that reads light beams from the original 101 illuminated by the illumination device 103.

The integrated-type scanning optical system unit 107 further has turn-back mirrors 104a to 104d that guide light beams from the original 101 to the reading unit 105 and an imaging optical system (or imaging lens) 106 that focuses light beams having image information from the original 101 to form an image on the surface of the reading unit 105. The integrated-type scanning optical system unit 107 having the above described construction is moved for scanning by a driving motor (sub scanning motor) 108 in the direction (sub-scanning direction) indicated by arrow A in FIG. 3. The components constituting the integrated-type scanning optical system unit 107 move without changing their relative positional relationship to scan the original.

In FIG. 3, the turn-back mirrors include a first turn-back mirror 104a, a second turn-back mirror 104b, a third turn-back mirror 104c, and a fourth turn-back mirror 104d. These mirrors are arranged in such a way that light beams from the original 101 travels from the first turn-back mirror 104a to the second turn-back mirror 104b, then from the second turn-back mirror 104b to the third turn-back mirror 104c, and then from the third turn-back mirror 104c to the fourth turn-back mirror 104d. The light beams reflected on the fourth turn-back mirror 104d are focused by the imaging optical system 106 to form an image on the surface of the reading unit 105.

In this apparatus, image information of the original read by the reading unit 105 is sent as an electrical signal to an image processing unit (not shown), where the electrical signal is processed by a specific image processing and then output. The image reading apparatus 1 is also equipped with a power source unit (not shown) for driving the apparatus.

(Light Guide and Illumination Device)

Figure 2:
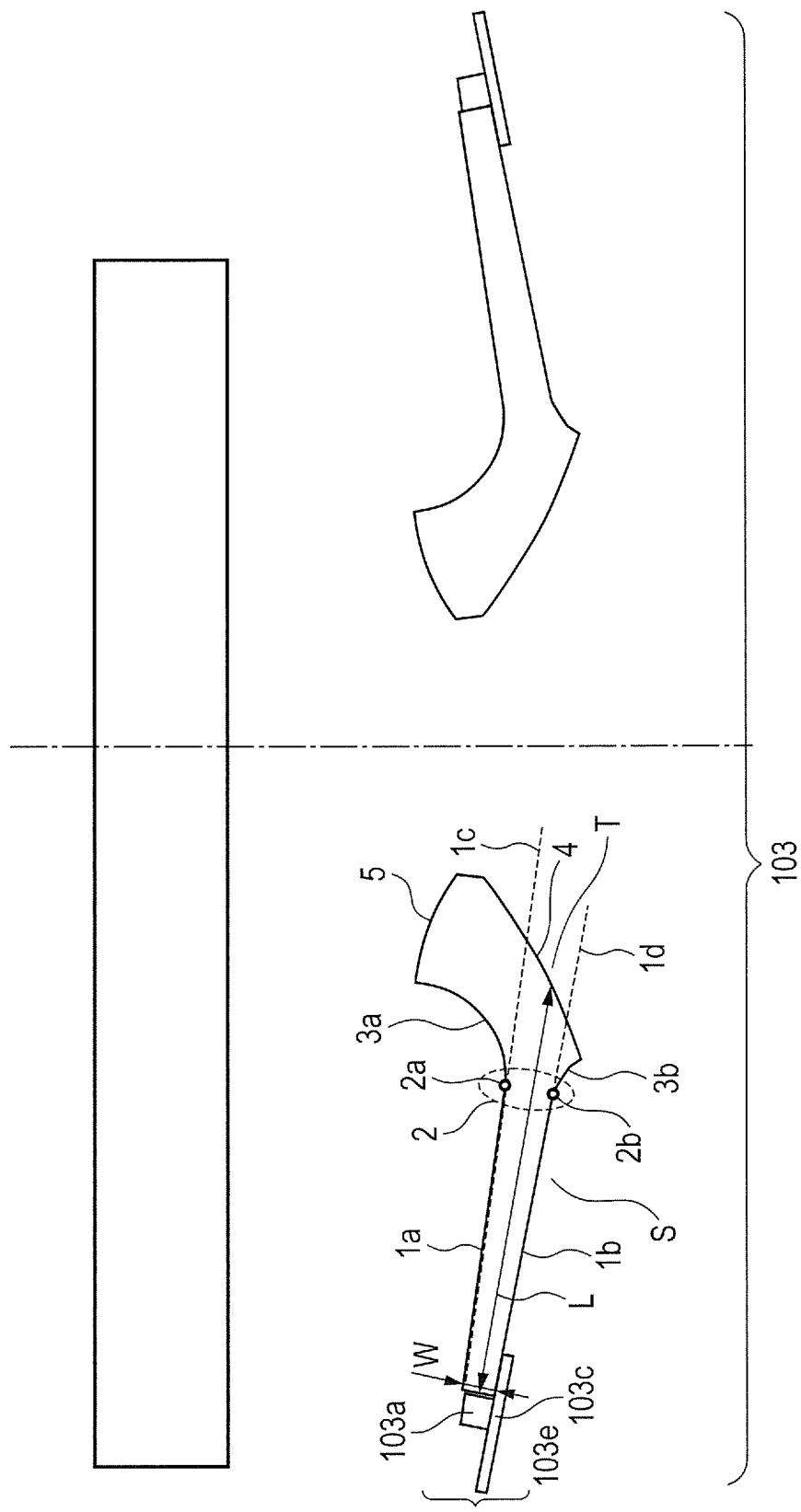
FIG. 2 is a schematic diagram of an illumination device having light guides according to the first embodiment that are arranged symmetrically.

The light guide and the illumination device in this embodiment will be described in further detail. FIG. 2 is a sub-scanning sectional view of the illumination device 103 in this embodiment. The illumination device 103 includes an LED array composed of a plurality of light emitting elements or white LEDs 103 arranged along the main scanning direction, a light guide made up of a first light guide part S and a second light guide part T that are integrated together, and a base plate 103c. The same illumination devices 103 are arranged symmetrically with respect to a reading position on one side of the reading position and on the other side of the reading position respectively.

The LED array having the plurality of LEDs 103a arranged in a row is arranged along the main scanning direction on the base plate 103c to constitute a light source unit 103e. The integrated light guide made up of the first light guide part S and the second light guide part T is made of an optical synthetic resin such as a plastic.

(First Light Guide Part S and Second Light Guide Part T)

The first light guide part S and the second light guide part T in the illumination device 103 will be described with reference to FIG. 1. In a cross section perpendicular to the direction in which the light source is arranged one-dimensionally, the first light guide part S guides light beams coming from the light source from an incident part (having width W) to a constricted part 2, which will be described later. In the cross section perpendicular to the direction of arrangement of the light source, the second light guide part T bends the optical path of the light beams coming from the incident part and passing through the constricted part 2 by a reflection condensing part 4 to guide the light beams to a light exit part 5 through which the light beams exit to the outside. The light exit part 5 has a light condensing function.

In the cross section perpendicular to the direction of arrangement of the light source, the first light guide part S has a first side part 1a that totally reflects light beams traveling from the incident part in a first direction and a second side part 1b that totally reflects light beams traveling from the incident part in a second direction. The light beams traveling from the incident part and totally reflected by at least one of the first side part 1a and the second side part 1b and the light beams traveling from the incident part directly without being reflected by the first side part 1a or the second side part 1b are superposed and guided to the constricted part 2.

The second light guide part T has the reflection condensing part 4 having a condensing function in the cross section perpendicular to the direction of arrangement of the light source and the light exit part 5 having a condensing function. The reflection condensing part 4 is located at a predetermined distance from the constricted part and totally reflects the light beams further diverging after passing through the constricted part. The second light guide part T further has a third side part 3a, which connects the first side part 1a at the constricted part 2 outwardly (toward the original table) to the light exit part 5 so that the light beams traveling from the constricted part 2 toward the reflection condensing part 4 are not restricted.

Furthermore, the second light guide part T has a fourth side part 3b, which connects the second side part 1b at the constricted part 2 outwardly (away from the original table) to the reflection condensing part 4 so that the light beams traveling from the constricted part 2 toward the reflection condensing part 4 are not restricted and that the reflection condensing part 4 is enlarged.

In this embodiment, the third side part 3a joins the light exit part 5, and the fourth side part 3b joins the reflection condensing part 4. However, another part may be provided between the third side part 3a and the light exit part 5 or between the fourth side part 3b and the reflection condensing part 4 to join them.

Figure 1:
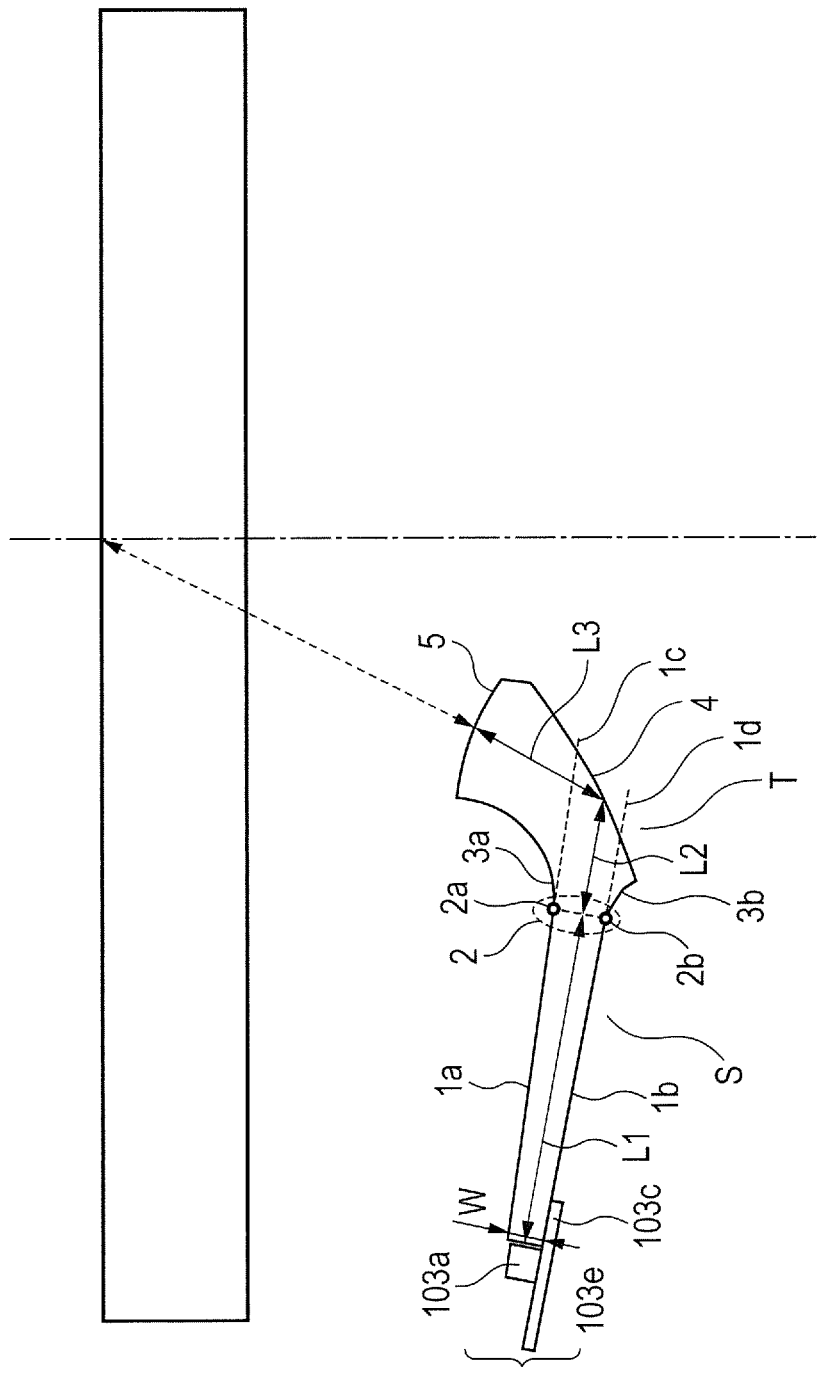
FIG. 1 is a schematic diagram showing the relevant portion of the light guide according to a first embodiment of the present invention.

In FIG. 1, in the first light guide portion S, the light beams from the light source 103a entering through the incident part are totally reflected multiple times by the side parts 1a, 1b to reach the constricted part 2 described below while being condensed. Then, by the second light guide part T, the light beams are caused to illuminate the surface of the original with the light condensing efficiency with respect to the sub-scanning direction being enhanced by the reflection condensing part 4 and the light exit part 5 each having a condensing function. In this embodiment, the same illumination device 103 is also provided on the opposite side with respect to the reading position. This reduces the influence of shadows when reading a three-dimensional object.

(Constricted Part)

In FIG. 1, in the first light guide part S, the light beams from the light source 103a entering through the incident part are totally reflected multiple times by the side parts 1a, 1b. This can be considered to be equivalent to the following. With respect to the width W of the incident portion, a plurality of mirror images of the incident portion are formed outside the side parts 1a, 1b by the side parts 1a, 1b, which are total reflection surfaces. Light beams from the plurality of mirror images straightly travel at respective incidence angles toward the exit of the first light guide part S. Thus, the constricted part 2 is formed at the position at which light beams are condensed as with the position of a stop. The direct light from the light source (i.e. the light that is not totally reflected by the side parts 1a, 1b) and the totally reflected light (e.g. the light having been totally reflected by the side parts of the light guide part multiple times and condensed) will pass the constricted part 2.

The constriction position 2a of the first side part 1a is at the boundary of the first side part 1a and the third side part 3a, and the constriction position 2b of the second side part 1b is at the boundary of the second side part 1b and the fourth side part 3b. In this embodiment, the flat surfaces of the first side part 1a and the second side part 1b join the curved surfaces of the third side part 3a and the fourth side part 3b continuously at the constriction positions 2a, 2b without an inflection point to extend outward. The continuous joining without an inflection point facilitates the molding of the light guide using an optical synthetic resin such as a plastic.

(Second Light Guide Part)

In FIG. 1, imaginary surfaces 1c, 1d as extensions of the first and second side parts 1a, 1b beyond the constricted part 2 are drawn by broken lines. As shown in FIG. 1, the first and second side parts 1a, 1b join, at the constricted part 2, the third and fourth side parts 3a, 3b that extend more outward than the corresponding imaginary surfaces 1c, 1d as they run in the direction from the constricted part 2 toward the reflection condensing part 4. In consequence, light beams regulated and condensed to some extent at the constricted part 2 can be reflected and efficiently condensed by the reflection condensing part 4 having an area larger than the constricted part 2 without being blocked in the second light guide part, which is configured to extend from the constricted part 2 outwardly on the both sides.

As the fourth side part 3b extends more outward than the imaginary surface 1d, the reflection area of the reflection condensing part 4 can be made larger. In this embodiment, the reflection condensing part 4 and the light exit part 5 are curved surfaces having respective positive powers in the cross section perpendicular to the direction of arrangement of the light source. Specifically, the reflection condensing part 4 has a radius of curvature R of 14.9 mm, and the light exit part 5 has a radius of curvature R of 5.87 mm.

In this embodiment, as shown in FIG. 2, the width W of the incident part of the light guide on the cross section perpendicular to the direction of arrangement of the light source (i.e. sub-scanning cross section) and the distance L from the light source to the reflection condensing part 4 are arranged to satisfy the following condition (1):

$$0 < W/L < 0.2 \tag{1}$$

Specific dimensions in this embodiment are L=12.2 mm and W=0.95 mm, and hence W/L=0.08. Condition (1) relates to the ratio of the light quantity of the light totally reflected by the first and second side parts 1a, 1b of the first light guide part and condensed and the light quantity of the light condensed without being totally reflected, among the light traveling toward the reflection condensing part 4 of the second light guide part.

When the ratio of the quantity of the light totally reflected by the side parts of the light guide and condensed and the quantity of the light condensed without being totally reflected falls within the range that meets condition (1), light beams having various angles can be collected by the total reflection. In consequence, the original can be illuminated at a variety of angles in the cross section perpendicular to the direction of arrangement of the light source (i.e. sub-scanning cross section), when the original is illuminated with the light condensed by the reflection condensing part and the light exit part thereafter.

Therefore, even in cases where the original to be read is glossy, the image can be read with high accuracy. If the upper limit of condition (1) is not satisfied, the quantity of the light condensed at the constricted portion 2 by total reflection by the first and second side parts 1a, 1b becomes much smaller than the quantity of the light reaching directly to the constricted part 2 without being totally reflected, among the light traveling toward the reflection condensing part 4. In consequence, light illuminating the original at a specific angle will be conspicuous, making it difficult to read the image with high accuracy in cases where the original to be read is glossy.

It is more desirable that the following condition (2) be satisfied:

$$0 < W/L < 0.15 \tag{2}$$

Then, it is desirable in order to make the influence of the mounting precision of the light source small that the width WL of the light source 103a in the cross section perpendicular to the direction of arrangement (i.e. sub-scanning cross section) satisfies the following relation with the width W of the incident part of the light guide:

$$WL < W \tag{3}$$

In this embodiment the dimension is WL=0.7 mm.

The shape of the light guide will be described in further detail with reference to FIG. 1. The light guide shown in FIG. 1 is the same as one shown in FIG. 2. In FIG. 1, the other illumination system located symmetrically with respect to the reading position is not shown, for the sake of illustration of the shape of the light guide. As shown in FIG. 1, the length L1 from the incident part of the light guide to the constricted part and the length L2 from the constricted part to the reflection condensing part are arranged to satisfy the following condition (4):

$$0.15 < L2/L1 < 0.8 \tag{4}$$

Furthermore, the length L2 from the constricted part to the reflection condensing part and the length L3 from the reflection condensing part to the light exit part are arranged to satisfy the following condition (5):

$$0.5L3/L2 < 2 \tag{5}$$

In the following, conditions (4) and (5) will be described. Condition (4) specifies a range of the ratio of the length from the incident part of the light guide to the constricted part 2 and the length from the constricted part 2 to the reflection condensing part 4. As far as the ratio falls within the range thus limited, the reflection condensing part 4 can be utilized efficiently. Below the lower limit of condition (4), the distance from the constricted part 2 to the reflection condensing part 4 is too short. Then, the light beams directly coming from the light source and passing through the constricted part 2 and the light beams totally reflected multiple times will reach the reflection condensing part 4 in a state in which they are not separated so much. Therefore, the reflection condensing part 4 cannot be utilized effectively for the light beams.

On the other hand, above the upper limit of condition (4), the reflection condensing part 4 will be necessitated to be large in order to condense all the light beams passing through the constricted part, leading to an increase in the size of the light guide and an increase in the overall size of the illumination system. For the above reason, the ratio of the distance from the incident part of the light guide to the constricted part and the distance from the constricted part 2 to the reflection condensing part 4 is limited in the range satisfying condition (4). Then, a small and efficient illumination system can be achieved.

Condition (5) specifies a range of the ratio of the distance from the constricted part to the reflection condensing part 4 and the distance from the reflection condensing part 4 to the light exit part 5. If the range of the ratio is satisfied, the light exit part 5 can be utilized effectively. Below the lower limit of condition (5), the distance from the reflection condensing part 4 to the light exit part 5 is too short. Then, the light beams directly coming from the light source and condensed by the reflection condensing part 4 and the light beams totally reflected multiple times will reach the light exit part 5 in a state in which they are not separated so much after reflected by the reflection condensing part 4. In consequence, the light exit part 5 cannot be utilized effectively for the light beams.

On the other hand, above the upper limit of condition (5), the light exit part 5 will be necessitated to be large in order to condense all the light beams condensed by the reflection condensing part 4, leading to an increase in the size of the light guide and an increase in the overall size of the illumination device. For the above reason, the ratio of the distance from the constricted part 2 to the reflection condensing part 4 and the distance from the reflection condensing part 4 to the light exit part 5 is limited in the range satisfying condition (5). Then, a small and efficient illumination system can be achieved.

Specific dimensions in this embodiment are L1=8.9 mm, L2=3.3 mm, and L3=4.1 mm, and hence L2/L1=0.37, and L3/L2=1.25.

It is desirable that the following conditions (6) and (7) be further satisfied:

$$0.3 < L2/L1 < 0.5 \quad (6),$$

and $$0.75 < L3/L2 < 1.5 \quad (7).$$

(Power Arrangement of Illumination System in Main Scanning Direction)

The power of the illumination system with respect to the main scanning direction (the direction of arrangement of the point light sources) may be zero. In other words, the reflection condensing part 4 and the light exit part may be cylindrical surfaces. However, in this embodiment, the reflection condensing part 4 is adapted to have a power with respect to the main scanning direction in order to improve angular characteristics of the illumination system with respect to the main scanning direction on the original surface, namely in order to reduce illuminance unevenness with respect to the main scanning direction. Specifically, a plurality of toric surface regions that have curvature along the main scanning direction are provided.

Thus, in the regions having curvature along the main scanning direction, light beams once converge and then diverge to illuminate the original. In consequence, illuminance unevenness with respect to the main scanning direction can be reduced. The power of the illumination system with respect to the main scanning direction may be allotted to the light exit part 5 instead of the reflection condensing part 4 or to both the reflection condensing part 4 and the light exit part 5.

While in this embodiment a reduction in illumination unevenness with respect to the main scanning direction is achieved by the power with respect to the main scanning direction, a diffusing pattern such as surface graining may be adopted instead of the curvature with respect to the main scanning direction.

Figure 4:
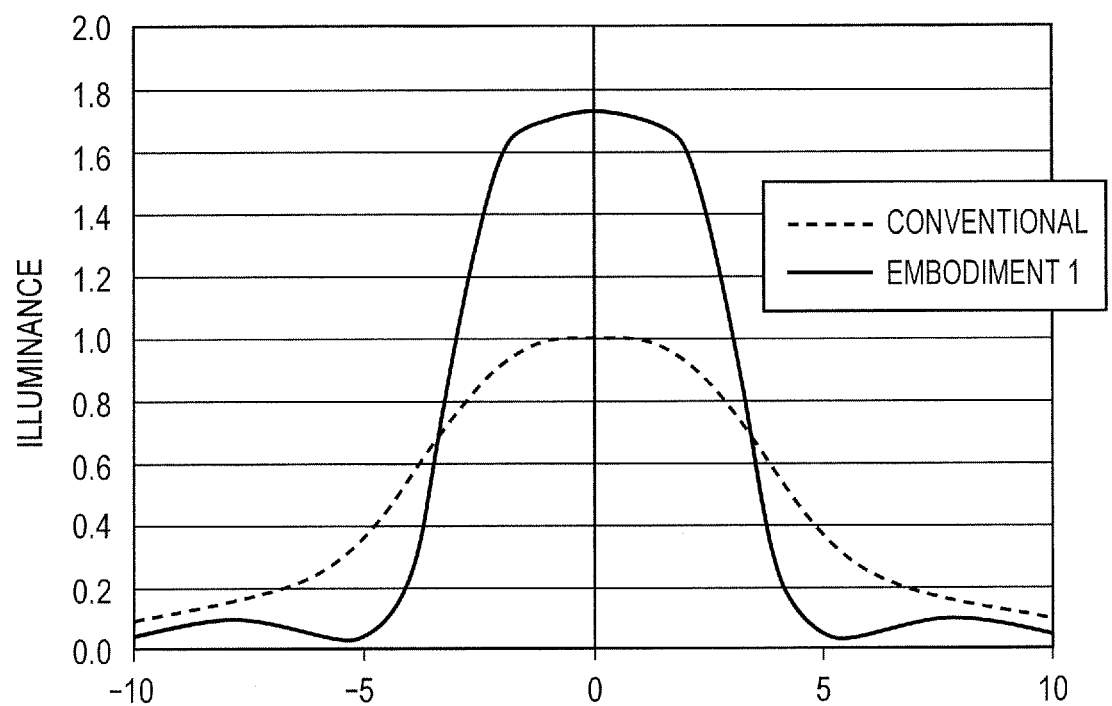
FIG. 4 is a graph comparing the light quantity between the first embodiment and a conventional apparatus.

FIG. 7 shows the shape of a conventional light guide having no constricted part. FIG. 4 shows the distribution of illuminance on the original surface in the cross section perpendicular to the direction of arrangement of the light source in the case of this embodiment and in the case of the conventional light guide. As will be clearly seen from FIG. 4, the light guide according to this embodiment can achieve a great improvement in the condensing efficiency with respect to the sub-scanning cross section perpendicular to the direction of arrangement of the light source.

Second Embodiment

Figure 5:
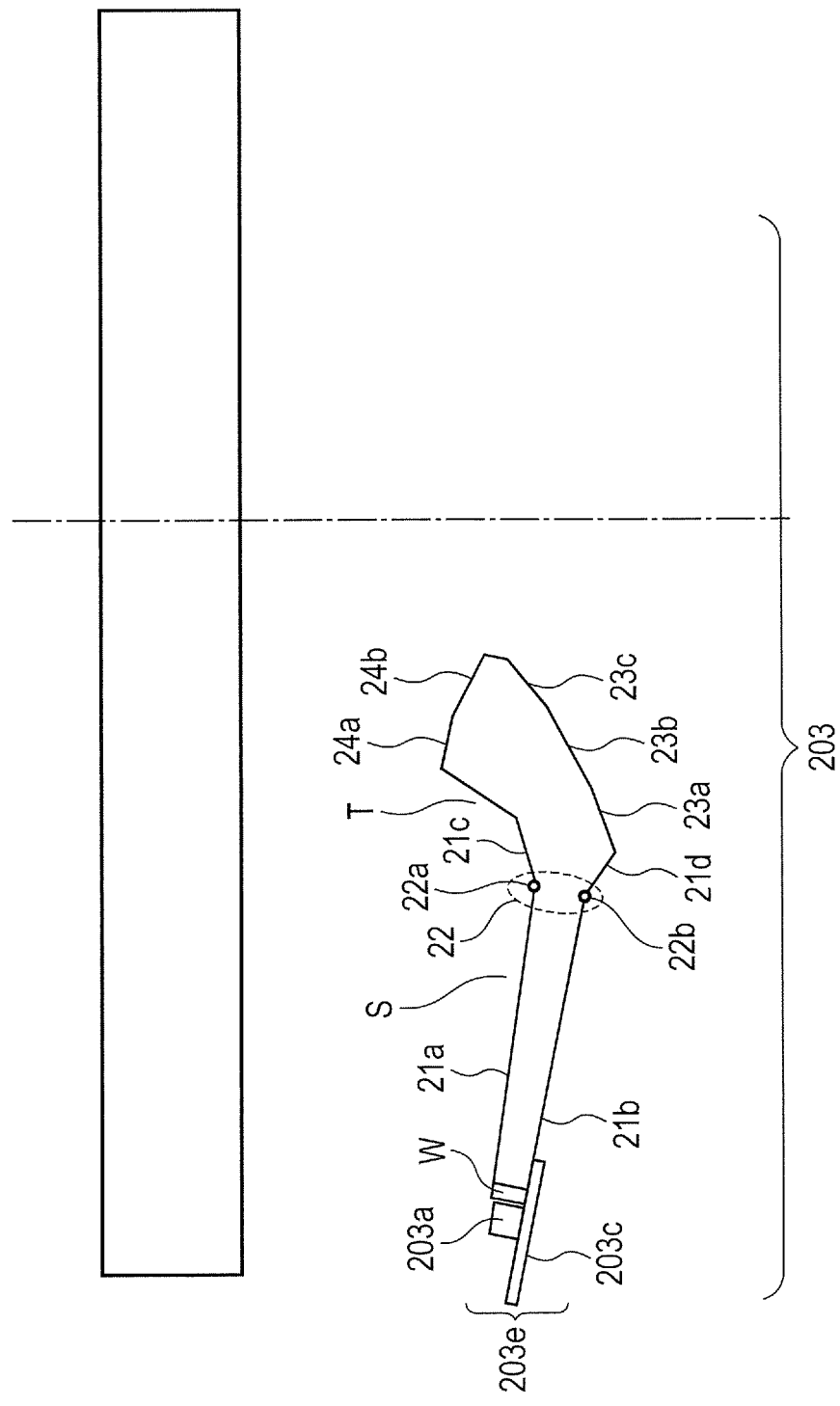
FIG. 5 is a schematic diagram of an illumination device using a light guide according to a second embodiment.

FIG. 5 is a sub-scanning sectional view of an original illumination optical system according to this embodiment. The construction as the image reading apparatus is the same as that in the first embodiment, and it will not be described. In the second embodiment, the illumination device 203 is provided only one side of the reading position, unlike with the first embodiment. This enables a reduction in the cost of the base plate. In this embodiment, furthermore, the outer surface of the light guide is basically made up of a plurality of joining flat surfaces.

The illumination device 203 totally reflects light coming from the light source 203a multiple times in a light guide part by side parts 21a, 21b provided on both sides of an incident part to deliver the light to a constricted part 22. Then the light is condensed in the constricted part 22 and guided to the surface of an original by a reflection condensing part 23a, 23b, 23c and a light exit part 24a, 24b having a condensing function to illuminate the original surface.

Next, the construction of the light guide having an outer surface made up of a plurality of joining flat surfaces in this embodiment will be described. What differs in the construction of this light guide from that of the first embodiment mainly resides in the construction of the constricted part and the shapes of the reflection condensing part and the light exit part. As shown in FIG. 5, in a cross section perpendicular to the direction of arrangement of the light source, light beams are reflected by the first and second side parts 21a, 21b provided on both sides of the incident part and delivered to the constricted part 22. The light guide has third and fourth side parts 21c, 21d that are arranged to extend from the constricted part 22 more outward than the first and second side parts 21a, 21b on both sides. The first and second side parts 21a, 21b join the third and fourth side parts 21c, 21d respectively with inflection points at the constricted part 22a, 22b.

As shown in FIG. 5, the reflection condensing part is composed of a plurality of parts 23a, 23b, 23c, and the light exit part is composed of a plurality of parts 24a, 24b. The reflecting surface and the light exit surface are configured so as to form a polygonal shape in the cross section perpendicular to the direction of arrangement of the light source, which is advantageous in the ease of manufacturing by molding. Furthermore, this design also facilitates the ease of manufacturing in providing a plurality of diffusers on the reflection condensing part or the light exit part along the direction of arrangement of the point light sources in order to improve angular characteristics of the illumination system on the original surface with respect to the direction of arrangement of the point light sources. An illustrative mode of the diffuser will be described in the following.

(Power Arrangement of Illumination System in Main Scanning Direction)

The power of the illumination system with respect to the main scanning direction (direction of arrangement of the point light sources) may be zero. In other words, the reflection condensing part 23a, 23b, 23c and the light exit part 24a, 24b may be flat surfaces extending in the main scanning direction. However, in this embodiment, the reflection condensing part 23a, 23b, 23c is adapted to have a power with respect to the main scanning direction in order to improve angular characteristics of the illumination system with respect to the main scanning direction on the original surface, namely in order to reduce illuminance unevenness with respect to the main scanning direction. Specifically, a plurality of cylindrical surface regions that have curvature along the main scanning direction are provided.

Thus, in the regions having curvature along the main scanning direction, light beams once converge and then diverge to illuminate the original. In consequence, illuminance unevenness with respect to the main scanning direction can be reduced. The power of the illumination system with respect to the main scanning direction may be allotted to the light exit part 24a, 24b instead of the reflection condensing part 23a, 23b, 23c or to both the reflection condensing part 23a, 23b, 23c and the light exit part 24a, 24b. Thus, the reflection condensing part and the light exit part each have a polygonal shape close to an arc. This is effective in achieving an additional advantage.

Specific dimensions in this embodiment are L=11 mm and W=1 mm, and hence W/L=0.09. Furthermore, L1=8 mm, L2=3 mm, and L3=3 mm, and hence L2/L1=0.38 and L3/L2=1.0. The width WL of the light source in the sub-scanning cross section is 0.9 mm.

Third Embodiment

Figure 6:
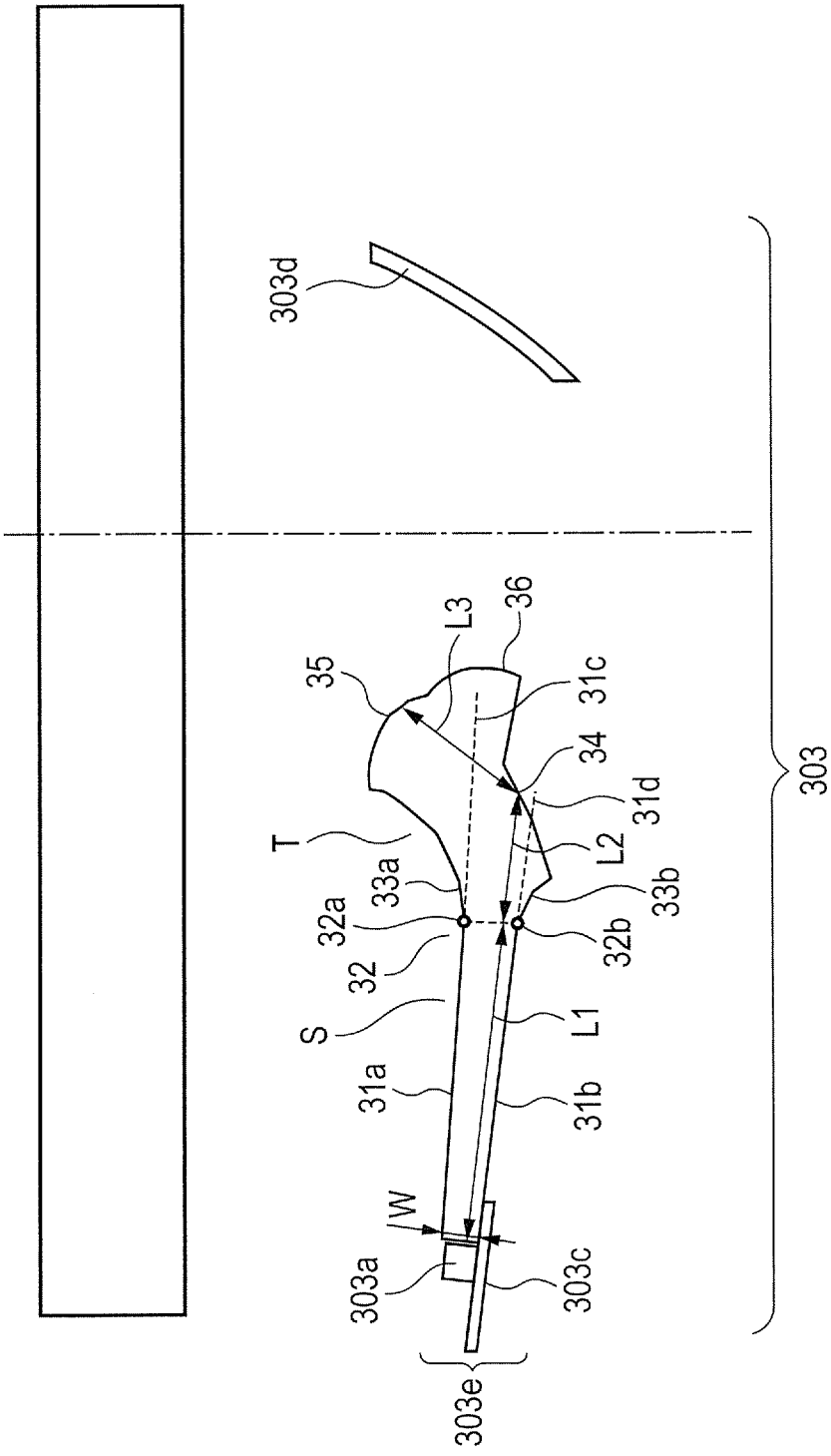
FIG. 6 is a schematic diagram of an illumination device using a light guide according to a third embodiment.

FIG. 6 is a sub-scanning sectional view of an illumination device according to the third embodiment. As the image reading apparatus, a modification is made only to the illumination system shown in FIG. 3. Therefore, the image reading apparatus will not be described. As shown in FIG. 6, the illumination device 303 includes an LED array composed of a plurality of light emitting elements or white LEDs 303a arranged along the main scanning direction, a light guide made up of a first light guide part S and a second light guide part T, and a base plate 303c. A reflection optical system 303d is provided on the opposite side with respect to the reading position. The LED array having the plurality of LEDs 303a arranged in a row is arranged along the main scanning direction on the base plate 303c to constitute a light source unit 303e. The light guide is made of an optical synthetic resin such as a plastic.

What is different in this embodiment from the first and second embodiments resides in that the light source of the illumination system is provided only on one side of the reading position and that a reflection member 303d is provided on the opposite side. These features enable a reduction in the cost of the base plate and a reduction in the influence of shadows when reading a three-dimensional object.

Next, the construction of the light guide in this embodiment will be described. As shown in FIG. 6, the first light guide part S of the illumination optical system 303 has an incident part through which light from the light source 303a enters, and a first side part 31a and a second side part 31b that guide the light entering through the incident part. The light is totally reflected by the first side part 31a and the second side part 31b multiple times to thereby be condensed in a constricted part 32.

(Second Light Guide Part)

The second light guide part T has a third side part 33a (curved part) and a fourth side part 33b (curved part) that extend outwardly so as not to restrict light beams passing through the constricted part 32 and traveling toward a reflection condensing part 34, and the reflection condensing part 34 that reflects light beams coming from the first light guide part S.

The second light guide part T further has a light exit part 35 that guides light beams from the constricted part 32 to the original surface and a second light exit part 36 for guiding light toward the reflection member 303d, which is provided to illuminate the original surface with light beams from a direction symmetric with the light beams from the light exit part 35. Light beams condensed in the constricted part 32 are guided onto the original surface as illuminating light beams by the reflection condensing part 34 and the light exit part 35 having a condensing effect. Moreover, the illumination device is adapted to illuminate the original surface from the opposite side with respect to the sub-scanning direction with light beams passing through the second light exit part 36 and reflected by the reflection member 303d disposed on the opposite side with respect to the reading position in the sub-scanning direction.

In FIG. 6, imaginary surfaces 31c, 31d as extensions of the first and second side parts 31a, 31b on the incident side of the constricted part are drawn by broken lines. As shown in FIG. 6, the third and fourth side parts 33a, 33b are configured to extend from the constricted part more outward than the corresponding imaginary surfaces 31c, 31d.

In this embodiment, the first side part 31a (flat surface) joins the third side part 33a (curved surface) at the constricted part 32a continuously without an inflection point. The second side part 31b (flat surface) joins the fourth side part 33b (curved surface) continuously without an inflection point.

In this embodiment, the reflection condensing part 34 and the light exit part 35 are curved surfaces each having a positive power in the cross section perpendicular to the direction of arrangement of the light source. The radius of curvature R of the reflection condensing part 34 is 30 mm, and the radius of curvature R of the light exit part 35 is 2.15 mm. Specific dimensions in this embodiment shown in FIG. 6 are: L=L1+L2=12.6 mm, and W=0.9 mm and hence W/L=0.07.

Other dimensions in this embodiment shown in FIG. 6 are, L1=8.6 mm, L2=4 mm, and L3=3.95 mm, and hence L2/L1=0.47, and L3/L2=0.99. The width WL of the cross section of the light source is 0.6 mm.

(Modification)

In the above-described embodiment, a plurality of LEDs is arranged along the main scanning direction to constitute the light source. Alternatively, a plurality of other type light sources may be arranged, or a single linear light source may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-203284, filed Sep. 16, 2011, which is hereby incorporated by reference herein in its entirety.

What is claimed is:

1. A light guide comprising:
   a first light guide part that guides light beams coming from a light source from an incident part to a constricted part, in a cross section perpendicular to a direction of arrangement of the light source, which is arranged one dimensionally; and
   a second light guide part that is integrated with the first light guide part and bends the optical path of light beams coming from the incident part and passing through the constricted part in the cross section perpendicular to the direction of arrangement of the light source to guide the light beams to a light exit part having a condensing function through which the light beams exit, wherein the first light guide part has a first side part that totally reflects light beams traveling from the incident part in a first direction and a second side part that totally reflects light beams traveling from the incident part in a second direction in the cross section perpendicular to the direction of arrangement of the light source to deliver light beams traveling from the incident part and totally reflected by at least one of the first side part and the second side part and light beams traveling from the incident part directly without being reflected by the first side part or the second side part to the constricted part in a superposed state, and the second light guide part has a reflection condensing part that has a condensing function in the cross section perpendicular to the direction of arrangement of the light source, is located at a predetermined distance from the constricted part, and totally reflects light beams further diverging after passing through the constricted part, a third side part that runs from the constricted part more outward than an imaginary surface as an extension of the first side part beyond the constricted part to connect the first side part to the light exit part in such a way that light beams traveling from the constricted part toward the reflection condensing part are not restricted, and a fourth side part that runs from the constricted part more outward than an imaginary surface as an extension of the second side part beyond the constricted part to connect the second side part to the reflection condensing part in such a way that light beams traveling from the constricted part toward the reflection condensing part are not restricted and that the reflection condensing part is enlarged.

2. The light guide according to claim 1, wherein at least one of the reflection condensing part and the light exit part has a plurality of toric surface regions having curvature with respect to a main scanning direction in which the light source is arranged.

3. The light guide according to claim 1, wherein in the constricted part, the third side part joins the first side part without an inflection point and the fourth side part joins the second side part without an inflection point.

4. The light guide according to claim 1, wherein in the constricted part, the third side part and the first side part, or the fourth side part and the second side part, are joined with an inflection point.

5. The light guide according to claim 4, wherein the reflection condensing part and the light exit part have an arc shape or a polygonal shape close to an arc shape in the cross section perpendicular to the direction of arrangement of the light source.

6. The light guide according to claim 1 further comprising a second light exit part from which light traveling from the constricted part without passing the reflection condensing part exits.

7. The light guide according to claim 1, wherein the reflection condensing part and the light exit part have a positive power in the cross section perpendicular to the direction of arrangement of the light source.

8. The light guide according to claim 1, wherein a length W of the incident part and a distance L from the incident part to the reflection condensing part in the cross section perpendicular to the direction of arrangement of the light source satisfy the following condition:

$$0 < W/L < 0.2.$$

9. The light guide according to claim 1, wherein a length L1 from the incident part to the constricted part and a length L2 from the constricted part to the reflection condensing part satisfy the following condition:

$$0.15 < L2/L1 < 0.8.$$

10. The light guide according to claim 9, wherein a length L3 from the reflection condensing part to the exit part satisfies the following condition;

$$0.5 < L3/L2 < 2.0.$$

11. An illumination device comprising:
a light source arranged in a one-dimensional direction; and
a light guide that guides light from the light source;
wherein the light guide comprises:
a first light guide part that guides light beams coming from a light source from an incident part to a constricted part, in a cross section perpendicular to a direction of arrangement of the light source, which is arranged one dimensionally; and
a second light guide part that is integrated with the first light guide part and bends the optical path of light beams coming from the incident part and passing through the constricted part in the cross section perpendicular to the direction of arrangement of the light source to guide the light beams to a light exit part having a condensing function through which the light beams exit,
wherein the first light guide part has a first side part that totally reflects light beams traveling from the incident part in a first direction and a second side part that totally reflects light beams traveling from the incident part in a second direction in the cross section perpendicular to the direction of arrangement of the light source to deliver light beams traveling from the incident part and totally reflected by at least one of the first side part and the second side part and light beams traveling from the incident part directly without being reflected by the first side part or the second side part to the constricted part in a superposed state, and
wherein the second light guide part has a reflection condensing part that has a condensing function in the cross section perpendicular to the direction of arrangement of the light source, is located at a predetermined distance from the constricted part, and totally reflects light beams further diverging after passing through the constricted part, a third side part that runs from the constricted part more outward than an imaginary surface as an extension of the first side part beyond the constricted part to connect the first side part to the light exit part in such a way that light beams traveling from the constricted part toward the reflection condensing part are not restricted, and a fourth side part that runs from the constricted part more outward than an imaginary surface as an extension of the second side part beyond the constricted part to connect the second side part to the reflection condensing part in such a way that light beams traveling from the constricted part toward the reflection condensing part are not restricted and that the reflection condensing part is enlarged.

12. An image reading apparatus comprising:
an illumination device; and an image reading unit that reads an original illuminated by the illumination device;

wherein the illumination device includes a light source arranged in a one-dimensional direction; and a light guide that guides light from the light source;

wherein the light guide comprises:

a first light guide part that guides light beams coming from a light source from an incident part to a constricted part, in a cross section perpendicular to a direction of arrangement of the light source, which is arranged one dimensionally; and a second light guide part that is integrated with the first light guide part and bends the optical path of light beams coming from the incident part and passing through the constricted part in the cross section perpendicular to the direction of arrangement of the light source to guide the light beams to a light exit part having a condensing function through which the light beams exit, wherein the first light guide part has a first side part that totally reflects light beams traveling from the incident part in a first direction and a second side part that totally reflects light beams traveling from the incident part in a second direction in the cross section perpendicular to the direction of arrangement of the light source to deliver light beams traveling from the incident part and totally reflected by at least one of the first side part and the second side part and light beams traveling from the incident part directly without being reflected by the first side part or the second side part to the constricted part in a superposed state, and wherein the second light guide part has a reflection condensing part that has a condensing function in the cross section perpendicular to the direction of arrangement of the light source, is located at a predetermined distance from the constricted part, and totally reflects light beams further diverging after passing through the constricted part, a third side part that runs from the constricted part more outward than an imaginary surface as an extension of the first side part beyond the constricted part to connect the first side part to the light exit part in such a way that light beams traveling from the constricted part toward the reflection condensing part are not restricted, and a fourth side part that runs from the constricted part more outward than an imaginary surface as an extension of the second side part beyond the constricted part to connect the second side part to the reflection condensing part in such a way that light beams traveling from the constricted part toward the reflection condensing part are not restricted and that the reflection condensing part is enlarged.

13. The image reading apparatus according to claim 12, wherein the original is illuminated obliquely from both sides symmetrically.

14. The image reading apparatus according to claim 13, wherein there are two light guides arranged symmetrically on both sides of the original in the cross section perpendicular to the direction of arrangement of the light source.

15. The image reading apparatus according to claim 13, wherein the light guide has a second light exit part from which light traveling from the constricted part exits in addition to the light exit part for illuminating the original obliquely from one side, and the image reading apparatus further comprises a reflection member for illuminating the original with light passing through the second light exit part from the other side symmetric with respect to the original.

* * * * *